United States Patent

Morita et al.

[11] Patent Number: 5,580,918
[45] Date of Patent: Dec. 3, 1996

[54] POLYIMIDE RESIN COMPOSITION

[75] Inventors: Atsushi Morita; Yoshihisa Gotoh; Toshiaki Takahashi; Kayako Ito; Hiroyasu Oochi; Tomohito Koba; Katunori Simamura; Hiroaki Tomimoto; Nobuhiro Takizawa, all of Kanagawa, Japan

[73] Assignee: Mitsui Toatsu Chemicals, Inc., Tokyo, Japan

[21] Appl. No.: 157,129

[22] PCT Filed: Apr. 21, 1993

[86] PCT No.: PCT/JP93/00515

§ 371 Date: Feb. 16, 1994

§ 102(e) Date: Feb. 16, 1994

[87] PCT Pub. No.: WO93/21277

PCT Pub. Date: Oct. 28, 1993

[30] Foreign Application Priority Data

Apr. 22, 1992 [JP] Japan ..................................... 4-103177
May 8, 1992 [JP] Japan ..................................... 4-115812
May 22, 1992 [JP] Japan ..................................... 4-130542

[51] Int. Cl.⁶ .................................................... C08L 77/06
[52] U.S. Cl. .......................... 524/413; 524/493; 524/496; 524/538; 525/420; 525/436
[58] Field of Search ..................... 525/436, 420; 524/413, 493, 496, 538

[56] References Cited

U.S. PATENT DOCUMENTS 5,013,817 5/1991 Ohta et al. ............................... 528/183
5,043,419 8/1991 Ohta et al. ............................... 528/353

FOREIGN PATENT DOCUMENTS 257150  3/1988  European Pat. Off. .
368590  5/1990  European Pat. Off. .
430640  6/1991  European Pat. Off. .
1-110538  4/1989  Japan .
1-188555  7/1989  Japan .
2-1759  1/1990  Japan .
4-13761  1/1992  Japan .

*Primary Examiner*—Ana Woodward
*Attorney, Agent, or Firm*—Burns, Doane, Swecker & Mathis

[57] ABSTRACT

A polyimide resin composition comprising 50–95 parts by weight of a polyimide resin represented by the following formula (1):

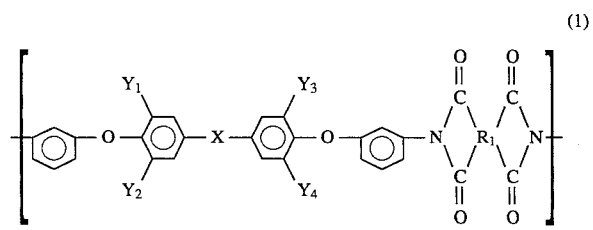

wherein X represents a direct bond, a hydrocarbon group, a carbonyl group, a thio group or so, $Y_1$–$Y_4$ individually represent a hydrogen atom, a lower alkyl group or so and $R_1$ represents an aliphatic group, an aromatic group or so; and 50–5 parts by weight of a polyetheretherketone, said composition having been subjected to heat treatment at 250°–330° C. and, after the heat-treatment, having crystallization enthalpy of 0–6 cal/g.

The heat treatment of the polyimide resin composition can be effected at a low temperature in a short time. The polyimide resin composition has excellent dimensional stability and high-temperature physical properties. Moreover, it has excellent moldability and peeling resistance.

7 Claims, No Drawings

POLYIMIDE RESIN COMPOSITION

TECHNICAL FIELD

This invention relates to polyimide resin compositions which, when subjected to heat treatment under specific conditions, are improved in flowability, stability and resin peeling resistance at the time of molding and are excellent especially in mechanical properties, sliding characteristics, heat resistance and chemical resistance at high temperatures.

BACKGROUND ART

Polyimide resins have excellent heat resistance along with high mechanical strength, flame retardance, electrical insulating property and the like so that they have conventionally been used in the fields of electric and electronic equipment, space and aircraft equipment and transportation equipment. Their utility is expected to expand from now on to fields where heat resistance is required. Some polyimide resins having excellent properties have already been developed.

Polyimide resins which have heretofore been developed, however, have poor processability despite their excellent heat resistance. Further, resins of the type developed, for example, for improved processability are inferior in heat resistance and solvent resistance. Thus, the conventional polyimide resins have both merits and demerits.

Described specifically, polyimide resins ("Kapton" and "Vespel", trade names; products of E.I. du Pont de Nemours & Co., Inc.) which are described in J. Polym. Sci. Macromol, Rev., 11, 161 (1976) and J. Elast. Plast., 7, 285 (1975) and have a basic skeleton structure represented by the following formula (5);

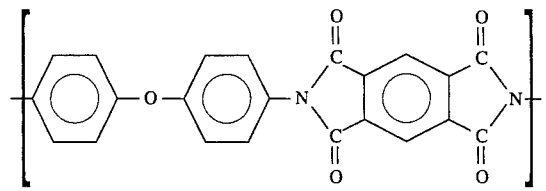

(5)

have no distinct glass transition temperature and have excellent heat resistance. It is, however, difficult to process these resins when they are used as molding materials. They have to be processed using techniques such as sinter molding. When used as materials for electric or electronic parts, they are accompanied by the drawback that the dimensional stability, insulation property and solder resistance are adversely affected.

A polyether imide resin ("ULTEM", trade name; product of General Electric Co., Ltd.) having a basic skeleton represented by the following formula (6):

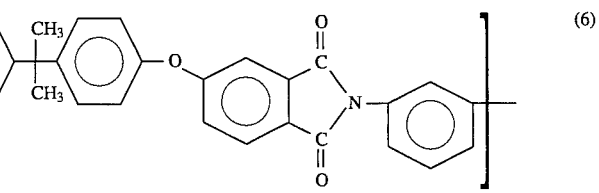

(6)

has excellent processability. It has, however, a glass transition point as low as 217° C. and thus has inferior heat-resistance. It is also unsatisfactory from the viewpoint of solvent resistance, for it is soluble in halogenated hydrocarbons such as methylene chloride.

With a view toward overcoming these drawbacks, the present applicant developed polyimide resins having recurring units represented by the following formula (1):

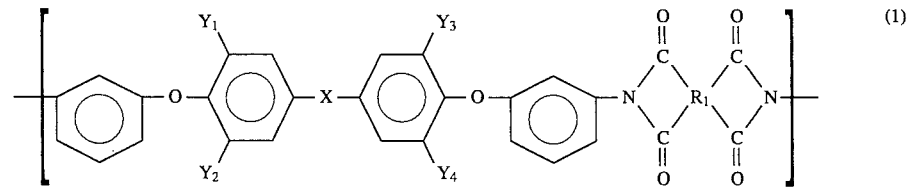

(1)

wherein X represents a direct bond or a group selected from the group consisting of a divalent hydrocarbon group having 1–10 carbon atoms, a hexa-fluorinated isopropylidene group, a carbonyl group, a thio group, a sulfonyl group and an oxo group; $Y_1$, $Y_2$, $Y_3$ and $Y_4$ individually represent a group selected from the group consisting of a hydrogen atom, a lower alkyl group having 1–9 carbon atoms, a lower alkoxy group having 1–9 carbon atoms, a chlorine atom and a bromine atom; and $R_1$ represents a tetravalent group having 2–27 carbon atoms, said tetravalent group being selected from the group consisting of aliphatic groups, monocyclic aliphatic groups, monocyclic aromatic groups, fused polycyclic aromatic groups and non-fused polycyclic aromatic groups with aromatic rings bonded together directly or via a crosslinking member and have already filed patent applications thereon (Japanese Patent Laid-Open Nos. 236858/1987 and 253655/1987).

The polyimide resins described above have been used widely for their excellent properties such as thermal and electrical properties. These resins have, however, a low crystallization velocity and their molded products obtained by injection molding, for example, at a mold temperature of 50°–250° C. is generally amorphous. To employ them as crystallized products, heat treatment is needed such as the method disclosed in Japanese Patent Laid-Open No. 110538/1989. This method, however, is conducted under long-hour and high-temperature conditions. At a temperature of 270° C., for example, heat treatment as long as 12 hours or longer is required. In addition, the molded polyimide resin products are deformed upon this heat treatment, leading to the problem of a substantial, dimensional change. On the other hand, heat treatment in a short time requires a high temperature so that deterioration of the resin is promoted.

To improve the drawbacks of such molded polyimide resin products, the present applicant also found that blending of a thermotropic liquid crystalline polymer with the polyimide resin is effective, resulting in an application for patent (Japanese Patent Laid-Open No. 175373/1992). The resin composition so obtained is excellent in heat resistance, toughness, processability and the like so that expansion of its use is under way to such fields wherein a metal or ceramic has heretofore been considered indispensable. Molded products obtained from this resin composition are, however, accompanied by the drawback that they have substantial anisotropy. By the addition of the liquid crystalline polymer, the crystallization velocity of the polyimide resin is effectively increased, so that the conditions for liquid crystallization are relaxed. The resin composition so obtained, however, involves the problems that molded products tend to develop warpage after heat treatment and molded products undergo peeling at portions corresponding to gates owing to dispersion of the liquid crystalline polymer into a layer in the vicinity of the gates.

A resin composition obtained by adding a polyether ketone to the above polyimide resin is also disclosed in Japanese Patent Laid-Open No. 175373/1992. This resin composition, however, is inferior in heat stability and flowability at high temperatures and therefore has drawbacks in molding conditions.

As has been described above, the conventional polyimide resin compositions are still not satisfactory.

DISCLOSURE OF THE INVENTION

An object of the present invention is to provide a polyimide resin composition which makes it possible to substantially relax the conventional heat-treatment conditions of high temperature and long term for polyimide resin compositions, has good dimensional stability before and after heat treatment, has excellent high-temperature physical properties, and moreover, is improved in the flowability and stability at the time of molding and also in the anisotropy of heat-treated products and the resistance to resin peeling.

To attain the above object, the present inventors have proceeded with an extensive research. As a result, it has been found that by blending a specific amount of a polyetheretherketone with the polyimide resin described above, the crystallization of the polyimide resin upon heat treatment can be accelerated markedly and the polyimide resin composition can be heat treated under substantially relaxed conditions. It has also been found that the heat-treated product so obtained has a small degree of anisotropy, retains good dimensional stability before and after the heat treatment, is free from peeling problem of one or more of the resins and has excellent high-temperature physical properties, leading to the completion of the present invention.

Namely, the present invention provides a polyimide resin composition comprising 50–95 parts by weight of a polyimide resin having recurring units represented by the following formula (1):

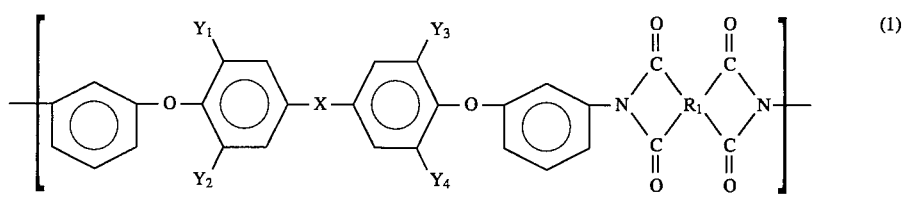

wherein X represents a direct bond or a group selected from the group consisting of a divalent hydrocarbon group having 1–10 carbon atoms, a hexa-fluorinated isopropylidene group, a carbonyl group, a thio group, a sulfonyl group and an oxo group; $Y_1$, $Y_2$, $Y_3$ and $Y_4$ individually represent a group selected from the group consisting of a hydrogen atom, a lower alkyl group having 1–9 carbon atoms, a lower alkoxy group having 1–9 carbon atoms, a chlorine atom and a bromine atom; and $R_1$ represents a tetravalent group having 2–27 carbon atoms, said tetravalent group being selected from the group consisting of aliphatic groups, monocyclic aliphatic groups, monocyclic aromatic groups, fused polycyclic aromatic groups, and non-fused polycyclic groups with aromatic rings bonded together directly or via a crosslinking member; and 50–5 parts by weight of a polyetheretherketone, said composition having being subjected to heat treatment at 250°–330° C. and, after the heat treatment, having crystallization enthalpy of 0–6 cal/g as measured by a differential scanning calorimeter at a heating rate of 10° C./min.

The present invention further provides a fiber-reinforced polyimide resin composition comprising 99–50 parts by weight of the above polyimide resin composition and 1–50 parts by weight of fibers.

The polyimide resin composition according to the present invention can be heat-treated in a short time at a low temperature without impairing the characteristics of the base polyimide resin. The heat-treated product so obtained has excellent dimensional stability with small dimensional variations and small roundness and excellent high-temperature physical properties. In addition, it has good flowability and stability at the time of molding so that it can be molded under relaxed conditions. Moreover, each heat-treated product has a small degree of anisotropy and does not develop resin peeling.

Due to its excellent high-temperature physical properties, sliding characteristics, heat resistance and chemical resistance, heat-treated products of the polyimide resin composition can be used widely as machine parts such as gears, cams, pushings, pulleys, sleeves and bearings; electrical and electronic parts such as connectors, bobbins and IC sockets; automobile parts such as impellers, manifolds, valve guides, valve systems, piston skirts, oil pans, front covers and locker covers; sliding parts for various other equipment. The present invention, therefore, has extremely high significance.

Fiber-reinforced polyimide resin compositions can be prepared according to this invention, said compositions each containing fibers, bring about the further advantage that their heat resistance can be improved substantially by crystallization without impairment of the surface smoothness.

BEST MODE FOR CARRYING OUT THE INVENTION

A polyimide resin which is usable in the present invention and has, as a basic skeleton, recurring units represented by the formula (1) can be produced, for example, by reacting in the presence or absence of an organic solvent at least one ether diamine represented by the following formula (3):

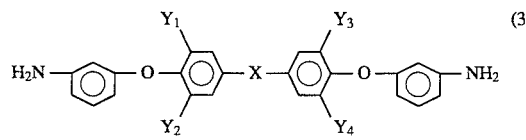

wherein X and $Y_1$–$Y_4$ have the same meanings as defined above with at least one tetracarboxylic dianhydride represented by the following formula (4):

wherein $R_1$ has the same meaning as defined above and thermally or chemically imidating the polyamic acid so obtained.

The reaction is ordinarily conducted at a temperature of 250° C. or lower. No particular limitation is imposed on the reaction pressure. The reaction can be fully conducted under normal pressure. The reaction time varies depending on the tetracarboxylic dianhydride, the solvent and the reaction temperature used. The reaction is generally conducted for a time long enough to complete the formation of the polyamic acid, which is an intermediate product. A reaction time of twenty-four hours or shorter or, in some cases, even of one hour is sufficient. By such a reaction, the polyamic acid corresponding to the recurring units of the formula (1) is obtained. By heating and dehydrating the polyamic acid at 100°–400° C. or by subjecting the polyamic acid to chemical imidation with a conventional imidating agent, the polyimide resin having recurring units of the formula (1) can be obtained. Alternatively, the polyimide resin can also be obtained by simultaneously conducting the formation of the polyamic acid and a thermal imidation reaction.

It is also possible to employ a polyimide resin whose molecular ends are capped with a dicarboxylic anhydride or an aromatic monoamine. This polyimide resin can be obtained by reacting an ether diamine represented by the formula (3) and a tetracarboxylic dianhydride represented by the formula (4) in the presence of a dicarboxylic anhydride represented by the following formula (A):

wherein $Z_1$ represents a divalent $C_{6-15}$ group selected from the group consisting of aliphatic groups, alicyclic groups, monocyclic aromatic groups, fused polycyclic aromatic groups, and non-fused polycyclic aromatic groups with aromatic rings bonded together directly or via a crosslinking member; or an aromatic monoamine represented by the following formula (B):

$$Z_2-NH_2 \quad (B)$$

wherein $Z_2$ represents a $C_{6-15}$ monovalent group selected from the group consisting of aliphatic groups, alicyclic groups, monocyclic aromatic groups, fused polycyclic aromatic groups, and non-fused polycyclic aromatic groups with aromatic rings bonded together directly or via a crosslinking member; and then thermally or chemically imidating the resultant polyamic acid.

The following are specific examples of the ether diamine which is represented by the formula (3) and is one of the raw materials for the production of the polyimide resin of the formula (1).

Examples of the diamine of the formula (3) in which X represents an aliphatic group include bis[4-(3-aminophenoxy) phenyl]methane, 1,1-bis[4-(3-aminophenoxy) phenyl]ethane, 1,2-bis[4-(3-aminophenoxy)phenyl]ethane, 2,2-bis[4-(3-aminophenoxy)phenyl]propane, 2-[4-(3-aminophenoxy) phenyl]-2-[4-(3-aminophenoxy)-3-methylphenyl]propane, 2,2-bis[4-(3-aminophenoxy)-3-methylphenyl]propane, 2-[4-(3-aminophenoxy)phenyl]-2-[4-(3-aminophenoxy)-3,5-dimethylphenyl]propane, 2,2-bis[4-(3-aminophenoxy)-3,5-dimethylphenyl]propane, 2,2-bis[4-(3-aminophenoxy)phenyl]butane and 2,2-bis[4-(3-aminophenoxy)phenyl]-1,1,1,3,3,3-hexafluoropropane.

Illustrative of the diamine of the formula (3) in which X represents a direct bond include 4,4'-bis(3-aminophenoxy)biphenyl, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3', 5,5'-tetramethylbiphenyl, 4,4'-bis(3-aminophenoxy)-3,3'dichlorobiphenyl, 4,4'-bis(3-aminophenoxy)-3,5-dichlorobiphenyl, 4,4'-bis(3-aminophenoxy)-3,3'-5,5'-tetrachlorobiphenyl, 4,4'-bis(3-aminophenoxy)-3,3'dibromobiphenyl, 4,4'-bis(3-aminophenoxy)-3,5-dibromobiphenyl and 4,4'-bis(3-aminophenoxy)-3,3', 5,5'-tetrabromobiphenyl.

Examples of the diamine of the formula (3) in which X represents a group —CO— include bis[4-(3-aminophenoxy)phenyl]ketone.

Exemplary diamine of the formula (3) in which X represents a group —S— include bis[4-(3-aminophenoxy)phenyl]sulfide, bis[4-(3-aminophenoxy)-3-methoxyphenyl]sulfide, bis[4-(3-aminophenoxy)phenyl][4-(3-aminophenoxy) 3,5-dimethoxyphenyl]sulfide and bis[4-(3-aminophenoxy)-3,5-dimethoxyphenyl]sulfide.

Illustrative of the diamine of the formula (3) in which X represents a group —SO₂— include bis[4-(3-aminophenoxy)phenyl]sulfone.

Examples of the diamine of the formula (3) in which X represents a group —O— include bis[4-(3-aminophenoxy)phenyl]ether.

These ether diamines may be used either singly or in combination.

It is also permissible to mix a still further diamine as long as the melt flowability of the thermoplastic polyimide resin described above is not impaired. Exemplary diamines which can be mixed include m-aminobenzylamine, p-aminobenzylamine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'diaminodiphenyl sulfone, 4,4'-diaminodiphenyl sulfone, 3,3'-diaminobenzophenone, 3,4'-diaminobenzophenone, 4,4'-diaminobenzophenone, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 2,2-bis[4-(4-aminophenoxy)phenyl]propane, 4,4'-bis(4-aminophenoxy)biphenyl, 4,4'-bis(4-aminophenoxy)phenyl]ketone, bis[4-aminophenoxy)phenyl]sulfide, bis[4-(4-aminophenoxy)phenyl]sulfone, bis[4-{4-(4-aminophenoxy)phenoxy})phenyl]ketone, bis[4-{4-(4-aminophenoxy)phenoxy}phenyl]sulfone, bis[4-(4-aminophenoxy)phenyl]ether, 1,4-bis[4-(3-aminophenoxy)phenoxy]benzene, 1,4-bis[4-(4-aminophenoxy)phenoxy]benzene, 1,4-bis[4-(3-aminophenoxy)benzoyl]benzene, 1,3-bis[4-(3-aminophenoxy)benzoyl]benzene and bis[4-{4-4-aminophenoxy)phenoxy}phenyl]sulfone.

Such a further diamine may generally account for 30 wt. % or less, preferably 5 wt. % or less.

Usable as the tetracarboxylic dianhydride, which is represented by the formula (4) and is the other one of the raw materials for the production of the polyimide resin of the formula (1) are compounds of the formula (4) in which R₁ represents at least one group selected from the group consisting of the following (a)–(e):

(a) aliphatic groups having 2–9 carbon atoms, (b) alicyclic groups having 4–10 carbon atoms, (c) monocyclic aromatic groups represented by the following formula:

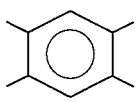

(d) fused polycyclic aromatic groups represented by the following formula:

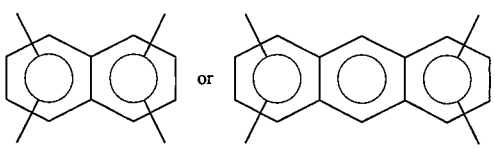

(e) non-fused polycyclic aromatic groups with aromatic rings bonded together directly or via crosslinking member, said groups being represented by the following formula:

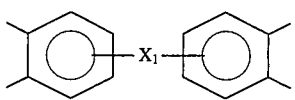

wherein X₁ represents a direct bond, a lower alkyl group having 1–6 carbon atoms, —O—, —S—, —SO₂—, —CO—,

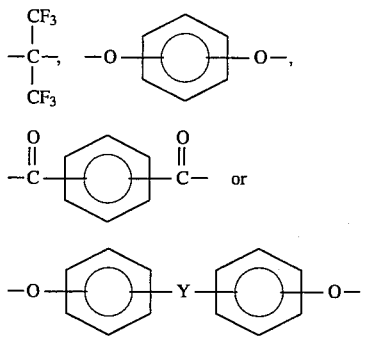

and Y represents a direct bond, —O—, —S—, —SO₂—, —CH₂—, —CO—,

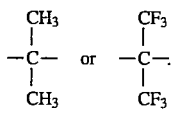

Examples of the tetracarboxylic dianhydride of the formula (4) in which R₁ represents an aliphatic group include 1,1,2,2-ethylenetetracarboxylic dianhydride, 1,2,1,2-ethylenetetracarboxylic dianhydride and butanetetracarboxylic dianhydride. Those in which R₁ represents an alicyclic group include cyclopentanetetracarboxylic dianhydride and those in which R₁ represents a monocyclic aromatic group include pyromellitic dianhydride and 1,2,3,4-benzenetetracarboxylic dianhydride.

Among the tetracarboxylic dianhydride of the formula (4) in which R₁ is represented by the following formula:

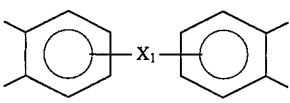

wherein X₁ represents a direct bond, a lower alkyl group having 1–6 carbon atoms, —O—, —S—, —SO₂—, —CO—,

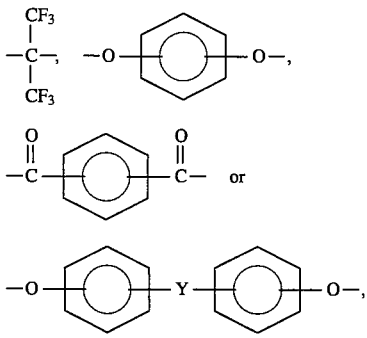

in which Y represents a direct bond, —O—, —S—, —SO₂—, —CH₂—, —CO—,

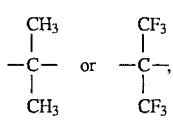

examples of the dianhydride in which $X_1$ represents a group —CO— include 3,3',4,4'-benzophenonetetracarboxylic dianhydride and 2,2'3,3'-benzophenonetetracarboxylic dianhydride, those in which $X_1$ represents a direct bond include 3,3',4,4'-biphenyltetracarboxylic dianhydride and 2,2',3,3'-biphenyltetracarboxylic dianhydride, those in which $X_1$ represents an aliphatic group include 2,2-bis(3,4-dicarboxyphenyl)propane dianhydride, 2,2-bis(2,3-dicarboxyphenyl)propane dianhydride, 1,1-(2,3-dicarboxyphenyl)ethane dianhydride, bis(2,3-dicarboxyphenyl)methane dianhydride and bis(3,4-dicarboxyphenyl)methane dianhydride, those in which $X_1$ represents the group —O— include bis(3,4-dicarboxyphenyl)ether dianhydride and those in which $X_1$ represents the group —SO$_2$— include bis(3,4-dicarboxyphenyl)sulfone dianhydride.

In addition, examples of the tetracarboxylic dianhydride of the formula (4) in which $R_1$ represents a fused polycyclic aromatic groups include 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride.

These dianhydrides can be used singly or in combination.

Examples of the dicarboxylic anhydride which is represented by the formula (A) and is used as needed as an end capping agent include phthalic anhydride, 2,3-benzophenonedicarboxylic anhydride, 3,4-benzophenonedicarboxylic anhydride, 2,3-dicarboxyphenylphenylether anhydride, 3,4-dicarboxyphenylphenylether anhydride, 2,3-biphenyldicarboxylic anhydride, 3,4-biphenyldicarboxylic anhydride, 2,3-dicarboxyphenylphenylsulfone anhydride, 3,4-dicarboxyphenylphenylsulfone anhydride, 2,3-dicarboxyphenylphenylsulfide anhydride, 3,4-dicarboxyphenylphenylsulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic anhydrides may each be substituted by a group having no reactivity with the amine or the dicarboxylic anhydride.

Among these dicarboxylic anhydrides, phthalic anhydride is most preferred from the viewpoints of the properties and utility of the polyimide resin to be obtained. Namely, the use of phthalic anhydride makes it possible to obtain a polyimide resin which has excellent molding stability at the time of high-temperature molding and is, therefore, very useful in parallel consideration of its excellent processability described above. When phthalic anhydride is employed, it may be substituted in part by another dicarboxylic anhydride to such an extent as not impairing the good physical properties of the polyimide resin.

The dicarboxylic anhydride can be used at a molar ratio of 0.001–1.0 relative to the ether diamine represented by the formula (2). Molar ratios smaller than 0.001 lead to an increase in viscosity at the time of high-temperature molding, thereby causing deterioration in the molding processability. On the other hand, molar ratios greater than 1.0 result in reduced mechanical properties. The preferred molar ratio may range from 0.01 to 0.5.

Examples of the aromatic monoamine of the formula (B) employed as needed as an end capping agent include aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenedine, m-phenedine, p-phenedine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenylpheyl ether, 3-aminophenylphenyl ether, 4-aminophenylphenyl ether, 2-aminobenzophenone, 3-aminobenzophenone, 4-aminobenzophenone, 2-aminophenylphenyl sulfide, 3-aminophenylphenyl sulfide, 4-aminophenylphenyl sulfide, 2-aminophenylphenyl sulfone 3-aminophenylphenyl sulfone, 4-aminophenylphenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene and 9-aminoanthracene. These aromatic monoamines may each be substituted by a group having no reactivity with the amine or the dicarboxylic anhydride.

The aromatic monoamine can be used at a molar ratio of 0.001–1.0 relative to the tetracarboxylic dianhydride represented by the formula (3). Molar ratios smaller than 0.001 lead to an increase in viscosity at the time of high-temperature molding, thereby causing deterioration in molding processability. Molar ratios greater than 1.0, on the other hand, result in reduced mechanical properties. The preferred molar ratio may range from 0.01 to 0.5.

The logarithmic viscosity of the polyimide resin having recurring units represented by the formula (1) falls within a range of 0.35–0.65 dl/g, preferably 0.40–0.60 dl/g. Logarithmic viscosities smaller than 0.35 dl/g tend to result in insufficient mechanical properties and durability. On the other hand, those greater than 0.65 dl/g lead to deteriorated moldability, which tends to make it difficult to conduct injection molding. Here, the logarithmic viscosity is measured by heating and dissolving a resin in a 90:10 by weight mixed solvent of parachlorophenol and phenol at a resin concentration of 0.5 g per 100 ml and then cooling it to 35° C.

The polyetheretherketone useful in the present invention is a thermoplastic resin having a basic structure represented by the following formula (2):

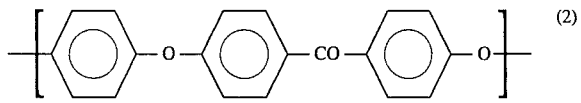

Representative examples of the commercially-available polyetheretherketones include "VICTREX PEEK 450P" "VICTREX PEEK 380P" and "VICTREX PEEK 150P" (all trade names) produced by ICI Corporation, Great Britain.

In the present invention, 50–5 parts by weight of a polyetheretherketone are blended with 50–95 parts by weight of a polyimide resin (to give 100 parts by weight in total). Amounts of polyetheretherketone greater than 50 parts by weight lower the high-temperature mechanical properties of a heat-treated product to be obtained, thereby damaging the excellent high-temperature physical properties of the polyimide resin. If the amount of polyetheretherketone is smaller than 5 parts by weight, on the other hand, the crystallization accelerating effect is reduced so that neither lowering of the heat-treatment temperature nor shortening of the heat-treatment time can be expected and, moreover, the heat-treated product so obtained shows marked dimensional variations. The preferred amount of polyetheretherketone is 40–5 parts by weight relative to 60–95 parts by weight of the polyimide resin. The further preferred amount of polyetheretherketone is 40–10 parts by weight relative to 60–90 parts by weight of the polyimide resin.

The polyimide resin composition according to the present invention is the one already subjected to heat treatment at 250°–30° C. When the polyimide resin composition is measured after the heat treatment by a differential scanning calorimeter (hereinafter abbreviated as "DSC") at a heating rate of 10° C./min, the polyimide component in the heat-treated resin has crystallization enthalpy within a range of 0–6 cal/g.

Heat-treatment conditions sufficient to obtain the above result by DSC measurement are, for example, 10 at least 20 hours at 250° C., at least 5 hours at 260° C., at least 3 hours at 270° C., at least 30 minutes at 290° C., at least 30 seconds at 300° C. and at least 10 seconds at 320° C. Heat treatment temperatures lower than 250° C. require a heat treatment time as long as 300 hours so that such low heat treatment temperatures are impractical. Heat treatment temperatures higher than 330° C., on the other hand, cause substantial deformation so that such high heat treatment temperatures are also impractical. In consideration of both the practical convenience and the deformation, temperature within the range 260°–310° C. are desired, with 260°–290° C. being particularly preferred.

The crystallization enthalpy of the polyimide component as measured by DSC shows how high the crystallization degree of the polyimide component is during heat treatment. For instance, the crystallization enthalpy value (ΔHc) of 0 cal/g as measured by DSC means that the crystallization of the polyimide component has already reached the maximum degree by heat treatment and no crystallization has occurred at the time of the DSC measurement. Since the maximum crystallization degree of the polyimide resin is 30–40%, the crystallization value (ΔHc) of 0 cal/g of the polyimide component means that the crystallization degree of the polyimide resin is 30–40%.

The crystallization enthalpy value (ΔHc) of amorphous polyimide as measured by DSC is 8–10 cal/g, so that ΔHc of 8–10 cal/g means that the crystallization degree of the polyimide resin is 0%.

In short, the smaller the crystallization enthalpy value (ΔHc) of the polyimide component as measured by DSC, the more the crystallization has proceeded by heat-treatment.

In this invention, a fiber-reinforced polyimide resin composition comprising 99–50 parts by weight of the polyimide resin composition according to the present invention and 1–50 parts by weight of fibers can also be obtained. If the amount of the fibers is smaller than 1 part by weight, fibers do not bring about sufficient reinforcing effects. Amounts greater than 50 parts by weight, on the other hand, cause substantial deterioration in surface smoothness at the time of crystallization after molding.

No particular limitation is imposed on the fibers employed. Examples of the fibers include PAN and pitch carbon fibers, glass fibers, metal fibers, aramid fibers represented by "Kevlar" (trade name), potassium titanate fibers, aluminum borate fibers and Tylano fibers.

The polyimide resin composition of the present invention may also contain, as needed, fibrous reinforcing materials besides the above fiber-reinforcing materials, (such as optical fibers, ceramic fibers, boron fibers, silicon carbide fibers, asbestos and rock wool); fillers such as calcium carbonate, mica, glass beads, graphite, molybdenum disulfide, clay, silica, alumina, talc, diatomaceus earth, hydrated alumina and "shirasu" balloons; lubricants, mold release agents, stabilizers, colorants and nucleating agents; other thermoplastic resins (such as polyphenylene sulfide, polyether imide and polyether sulfone); thermosetting resins (such as epoxy resins, silicone resins, polyamide imide resins) and/or fluorinated resins such as polytetrafluoroethylene.

The present invention will hereinafter be described in detail by Examples and Comparative Examples.

The followings are the polyetheretherketones (PEEKs), polyetherketone (PEK) and liquid-crystalline polymers (LCPs) employed in the Examples and Comparative Examples.

(1) Polyetheretherketones
 "PEEK 450P", product of ICI Corporation
 "PEEK 380P", product of ICI Corporation (2) Polyetherketone
 "PEK 220P", product of ICI Corporation (3) Liquid crystalline polymers
 "Xyder SRT500", product of Nippon Petro-chemicals Co., Ltd.
 "Econol E6000", product of Sumitomo Chemical Co., Ltd.

EXAMPLE 1–12

In each example, a polyimide resin (80 parts by weight) having a logarithmic viscosity of 0.52 dl/g, said resin having been obtained using 4,4'-bis(3-aminophenoxy)biphenyl and pyromellitic dianhydride as raw materials, and 20 parts by weight of the polyetheretherketone ("PEEK 450P") were dry-blended. The resultant mixture was extruded and pelletized at 370°–400° C. through a twin-screw extruder. The pellets so obtained were charged into an injection molding machine (cylinder temperature: 370°–410° C., injection pressure: 900 kg/cm², mold temperature: 180° C.) to form test pieces specified in the below-described testing methods. After heat treatment under the corresponding conditions shown in Table 1, each test piece was measured according to the corresponding method described below. Results are shown in Table 1. As a heat-treatment apparatus, "Inert Oven DN43HI/63HI" (trade name) manufactured by Yamato Science Co., Ltd. was employed. The followings are the testing methods:

1) Measurement of dimensional change
 Dimensional variations in percentage of a plate of 75 mm×100 mm×2 mm (thickness) in the direction of the flow and in a direction perpendicular to the flow were measured before and after heat treatment.

2) Measurement of roundness
 The roundness of a ring having an external diameter of 75 mm, an internal diameter of 45 mm and a thickness of 2 mm after heat treatment was measured.

3) Tensile strength
 Tensile strength was measured in accordance with ASTM D-638.

4) Modulus in flexure
 Modulus in flexure was measured in accordance with ASTM-790.

5) Measurement by DSC
 The calorie (crystallization enthalpy) of a peak detected at 290°–320° C. in the course of heating (10° C./min) was measured using a differential scanning calorimeter. The value so obtained was calculated in terms of the calorie of the polyimide component, which is designated as a "crystallization enthalpy value" of the polyimide component in the heat-treated product.

Crystallization enthalpy value of the polyimide component during heat treatment

A×100÷(the amount of the polyimide component in the resin composition as expressed in terms of parts by weight)

where A is the calorie of a peak whose peak top is detected at 290°–320° C. and the unit is cal/g.

6) Existence or absence of peeling

Bending stress was applied by a nipper to the tensile test piece in the vicinity of a portion corresponding to the gate. Development or non-development of peeling of the surface layer at that time was observed.

EXAMPLES 13–24

In a similar manner to Example 1 except that the raw materials were blended at the corresponding ratios shown in Table 2, test pieces were prepared. Properties of each test piece were measured and the results are shown in Table 2. Incidentally, "PEEK 380P" was employed as PEEK.

EXAMPLES 25–36

In a similar manner to Example 1 except that the raw materials were blended according to the corresponding ratios and heat treatment conditions shown in Table 3, test pieces were prepared. Properties of each test piece were measured and the results are shown in Table 3. Incidentally, "PEEK 450P" was employed as PEEK.

EXAMPLES 37–48

In a similar manner to Example 1 except that the raw materials were blended according to the corresponding ratios and heat treatment conditions shown in Table 4, test pieces were prepared. Properties of each test piece were measured and the results are shown in Table 4. Incidentally, "PEEK 450P" was employed as PEEK.

Comparative Examples 1–9

In a similar manner to Example 1 except that a polyimide resin was used singly without polyetheretherketone and heat treatment was conducted according to the corresponding conditions in Table 5, test pieces were prepared. Properties of each test piece were measured and the results are shown in Table 5. Incidentally, "PEEK 450P" was employed as PEEK.

Comparative Examples 10–21

In a similar manner to Example 1 except that crystallization enthalpy was controlled to fall outside the range of the present invention as shown in Table 6 by conducting heat treatment under insufficient conditions, test pieces were prepared. Properties of each test piece were measured and the results are shown in Table 6. Incidentally, "PEEK 450P" was employed as PEEK.

Comparative Examples 22–23

In a similar manner to Example 1 except that the amount of the polyetheretherketone was increased to exceed the range of the present invention as shown in Table 7, test pieces were prepared. Properties of each test piece were measured and the results are shown in Table 7. Incidentally, "PEEK 450P" was employed as PEEK.

Comparative Examples 24–25

In a similar manner to Example 1 except that the amount of the polyetheretheketone was increased to exceed the range of the present invention as shown in Table 8, test pieces were prepared. Properties of each test piece were measured and the results are shown in Table 8. Incidentally, "PEEK 380P" was employed as PEEK.

Comparative Examples 26–27

In a similar manner to Example 1 except that, as shown in Table 9, the liquid-crystal polymer (LCP) was used instead of the polyetheretherketone, test pieces were prepared. Properties of each test piece were measured and the results are shown in Table 9.

EVALUATION OF EXAMPLES 1–48 and COMPARATIVE EXAMPLES 1–27

A comparison between Tables 1–4 (Invention Examples 1–48) and Table 5 (Comparative Examples 1–9) has provided the finding to be described next. In Comparative Examples 1–9 wherein the polyimide resin was singly used, the desired crystallization enthalpy was not attained even after heat-treatment at the high temperature for the long hours and the resulting compositions had inferior physical properties. In the present invention, on the other hand, the crystallization was completed in a short time at a low temperature.

A comparison between Tables 1–4 (Invention Examples 1–48) and Table 6 (Comparative Examples 10–21) indicates that in Comparative Examples 10–21 wherein the desired crystallization enthalpy was not attained, each composition obtained was insufficiently crystallized, resulting in a drastic reduction in tensile strength and particularly in modulus in flexure at 230° C., namely, underwent substantial deterioration in mechanical properties at high temperatures.

According to a comparison between Tables 1–4 (Invention Examples 1–48) and Table 7–8 (Comparative Examples 22–25), the resin composition of Comparative Examples 22–25 in each of which the amount of the polyetheretherketone exceeded the range specified in the present invention was reduced in tensile strength, especially in modulus in flexure and the like at 230° C., so that its mechanical properties were substantially deteriorated at high temperatures. A comparison between Tables 1–4 (Invention Examples 1–48) and Table 9 (Comparative Examples 26–27) which are directed to the resin compositions with the liquid crystalline polymer has provided the finding to be described next. The compositions in Examples 1–48 each formed of the polyimide resin and the polyetheretherketone undergo isotropic dimensional variations and have small roundness at the time of heat treatment, so that they permit easy design of molds for various molded products, have good dimensional stability and, are free from peeling between the resins. In contrast, the compositions of Comparative Examples 26–27 each formed of the polyimide resin and the liquid crystalline polymer are inferior in roundness and develop peeling.

EXAMPLES 49–50, COMPARATIVE EXAMPLES 28–29

In a similar manner to Example 1 except that the raw materials were blended at the ratios shown in Table 10, resin compositions were prepared. The heat stability of those compositions were compared. Heat stability was evaluated by measuring the spiral flow length of each composition. The measurement of the spiral flow length was conducted at a cylinder temperature of 410° C., a mold temperature of 180° C., an injection pressure of 1500 kg/cm$^2$ and a thickness of 1 mm (without residence). After that, the resin (composition) was allowed to remain in the cylinder for 10 minutes at 410° C. and its spiral flow length was then measured again under the above conditions (after 10-minute residence)

As is envisaged from Table 10, the spiral flow length of the composition in each of Examples 49 and 50 is longer than that of the composition in each of Comparative Examples 28 and 29 after 10-minute residence. This suggests that a resin composition formed of a polyimide resin and PEEK is substantially improved in fluidity and thermal stability compared with that formed of a polyimide resin and PEK.

The present invention will hereinafter be described in further detail by the following Examples and Comparative Examples, which are directed to fiber-reinforced polyimide resin compositions. Incidentally, the measurements in the following Examples and Comparative Examples were conducted by the following methods, respectively:

Ra: the measurement of center line average roughness defined under in JIS-B0601 was followed.

HDT: ASTM D-648 was followed.

EXAMPLES 51–55 AND Comparative Examples 30–32

In each Example and Comparative Example, the polyimide resin powder obtained using 4,4'-bis(3-aminophenoxy)biphenyl and pyromellitic dianhydride as raw materials, the polyetheretherketone ("VICTREX PEEK 450P, Natural"; product of ICI Corporation) and the 3-mm long fiber bundles shown in Table 11 were dry-blended according to the corresponding composition described in Table 11. It was extruded by an extruder having a diameter of 40 mm while being molten and kneaded at a temperature of 380°–400° C., whereby pellets of the uniform composition were obtained.

The pellets of the uniform composition so obtained were formed into a dumbbell test piece by an ordinary injection molding machine. The average surface roughness of the test piece was measured. After the test piece was crystallized by heating it at 260° C. for 20 hours and further at 320° C. for 2 hours, its average surface roughness was measured again. The results are shown in Table 11.

EXAMPLE 56

After a test piece having a size of 6 mm×70 mm ×3 mm was molded from the pellets obtained in Example 51, it was crystallized in a similar manner to Example 51. As a result of measurement, its HDT was found to be 340° C.

COMPARATIVE EXAMPLE 33

In a similar manner to Example 56 except that the amounts of the polyimide resin and PEEK were changed to 40 parts by weight and 60 parts by weight, respectively, the HDT of the resulting test piece was measured. As a result, it was found to be 312° C. This means that the polyimide resin composition of Comparative Example 33 was inferior in heat resistance to that of Example 56.

EXAMPLES 57–58 AND COMPARATIVE EXAMPLE 34

In each of the Examples and Comparative Examples, the polyimide resin powder obtained using bis[4-(3-aminophenoxy)phenyl]sulfide and pyromellitic dianhydride as raw materials, the polyetheretherketone and the fibers shown in Table 12 were dry-blended, followed by a similar treatment to Example 51. The Ra of the test piece so obtained was measured. The results are shown in Table 12.

EXAMPLES 59–60 AND COMPARATIVE EXAMPLE 35

In each of the Examples and Comparative Examples, the polyimide resin powder obtained using 2,2-bis[4-(3-aminophenoxy)phenyl]propane and 3,3', 4,4'-benzophenonetetracarboxylic dianhydride as raw materials, the polyetheretherketone and the fibers shown in Table 12 were dry-blended, followed by a similar treatment in Example 51. The Ra of the test piece so obtained was measured. The results are shown in Table 12.

EXAMPLE 61

The polyimide resin powder (70 parts by weight) of Example 51 and 30 parts by weight of 3 mm long carbon fibers were dry-blended and then extruded at an extrusion temperature of 400° C. while being melted and kneaded, whereby pellets were obtained. On the side, 70 parts by weight of the polyetheretherketone of Example 51 and 30 parts by weight of 3 mm long carbon fibers were dry-blended and then extruded at an extrusion temperature of 380° C. while being melted and kneaded, whereby pellets were obtained. The fiber-reinforced polyimide resin pellets (70 parts by weight) and 30 parts by weight of the fiber-reinforced polyetheretherketone pellets were dry-blended and then injection-molded into a dumbbell test piece. The dumbbell test piece so obtained was heated at 270° C. for 5 hours to crystallize the same and then, in a similar manner to Example 51, the Ra of the crystallized test piece was measured. The Ra before the crystallization was 0.72 μm, while that after the crystallization was 1.40 μm. The results were much the same as those of Example 51.

TABLE 1

Examples 1–12

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 1 | 250 | 20 h | 80 | 20 | 5.8 | 0.8 | 0.7 | 44 | 19.0 | 2.9 | 3.6 | 2.0 | Not observed |
| 2 | 260 | 5 h | 80 | 20 | 5.0 | 1.0 | 0.9 | 45 | 19.2 | 3.1 | 3.7 | 2.0 | Not observed |
| 3 | 260 | 10 h | 80 | 20 | 3.2 | 1.4 | 1.4 | 44 | 18.8 | 3.1 | 3.9 | 2.0 | Not observed |
| 4 | 270 | 3 h | 80 | 20 | 5.5 | 0.9 | 0.9 | 46 | 19.2 | 2.9 | 3.6 | 2.1 | Not observed |
| 5 | 270 | 5 h | 80 | 20 | 0.0 | 2.0 | 1.9 | 48 | 18.0 | 3.4 | 4.0 | 2.2 | Not observed |
| 6 | 280 | 2 h | 80 | 20 | 5.4 | 0.9 | 0.9 | 47 | 18.9 | 3.0 | 3.6 | 2.0 | Not observed |
| 7 | 280 | 5 h | 80 | 20 | 0.0 | 2.0 | 2.0 | 49 | 18.5 | 3.3 | 4.0 | 2.3 | Not observed |
| 8 | 290 | 30 min | 80 | 20 | 4.8 | 1.0 | 0.9 | 46 | 19.1 | 3.1 | 3.6 | 2.0 | Not observed |
| 9 | 290 | 1 h | 80 | 20 | 0.0 | 2.0 | 2.0 | 49 | 18.4 | 3.3 | 4.1 | 2.2 | Not observed |
| 10 | 300 | 1 min | 80 | 20 | 0.9 | 1.8 | 1.8 | 47 | 18.9 | 3.3 | 3.9 | 2.3 | Not observed |
| 11 | 300 | 30 min | 80 | 20 | 0.0 | 2.0 | 1.8 | 50 | 18.6 | 3.3 | 3.9 | 2.3 | Not observed |
| 12 | 320 | 30 min | 80 | 20 | 0.0 | 2.0 | 2.0 | 50 | 18.6 | 3.5 | 3.9 | 2.3 | Not observed |

TABLE 2

Examples 13–24

| No. | Heat treatment conditions Tmp. °C. | Time | Composition of product (part by weight) Polyimide resin[*1] | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 13 | 250 | 20 h | 60 | 40 | 5.2 | 0.5 | 0.5 | 25 | 19.1 | 4.9 | 4.0 | 1.6 | Not observed |
| 14 | 260 | 5 h | 60 | 40 | 4.7 | 0.5 | 0.4 | 26 | 19.2 | 5.1 | 3.9 | 1.6 | Not observed |
| 15 | 260 | 10 h | 60 | 40 | 3.0 | 0.7 | 0.6 | 27 | 18.9 | 5.1 | 4.0 | 1.6 | Not observed |
| 16 | 270 | 3 h | 60 | 40 | 5.2 | 0.5 | 0.5 | 25 | 19.2 | 4.9 | 3.9 | 1.6 | Not observed |
| 17 | 270 | 5 h | 60 | 40 | 0.0 | 1.0 | 0.9 | 30 | 18.9 | 5.3 | 4.3 | 1.8 | Not observed |
| 18 | 280 | 2 h | 60 | 40 | 3.8 | 0.6 | 0.6 | 29 | 19.1 | 5.1 | 4.0 | 1.6 | Not observed |
| 19 | 280 | 5 h | 60 | 40 | 0.0 | 1.0 | 0.9 | 31 | 18.8 | 5.3 | 4.2 | 1.7 | Not observed |
| 20 | 290 | 30 min | 60 | 40 | 3.9 | 0.6 | 0.6 | 28 | 19.0 | 5.1 | 4.0 | 1.6 | Not observed |
| 21 | 290 | 1 h | 60 | 40 | 0.0 | 1.0 | 1.0 | 31 | 18.6 | 5.2 | 4.2 | 1.7 | Not observed |
| 22 | 300 | 1 min | 60 | 40 | 0.7 | 0.9 | 0.9 | 28 | 18.7 | 5.2 | 4.1 | 1.7 | Not observed |
| 23 | 300 | 30 min | 60 | 40 | 0.0 | 1.0 | 0.9 | 32 | 17.9 | 5.3 | 4.3 | 1.7 | Not observed |
| 24 | 320 | 30 min | 60 | 40 | 0.0 | 1.0 | 1.0 | 32 | 18.1 | 5.3 | 4.4 | 1.8 | Not observed |

[*1] A polyimide resin obtained using phthalic anhydride as an end sealant.

TABLE 3

Examples 25–36

| No. | Heat treatment conditions Tmp. °C. | Time | Composition of product (part by weight) Polyimide resin[*2] | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 25 | 270 | 3 h | 90 | 10 | 5.6 | 1.1 | 1.0 | 55 | 17.1 | 2.8 | 3.8 | 1.9 | Not observed |
| 26 | 280 | 5 h | 90 | 10 | 0.0 | 2.4 | 2.3 | 60 | 16.9 | 2.9 | 3.9 | 2.0 | Not observed |

TABLE 3-continued

Examples 25–36

| No. | Heat treatment conditions Tmp. °C. | Time | Composition of product (part by weight) Polyimide resin*2 | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 27 | 290 | 30 min | 90 | 10 | 4.9 | 1.2 | 1.2 | 62 | 17.2 | 2.8 | 3.8 | 1.9 | Not observed |
| 28 | 300 | 1 min | 90 | 10 | 1.0 | 2.2 | 2.2 | 63 | 17.0 | 2.9 | 3.9 | 1.9 | Not observed |
| 29 | 270 | 3 h | 70 | 30 | 5.3 | 0.8 | 0.8 | 30 | 19.2 | 4.4 | 4.0 | 1.4 | Not observed |
| 30 | 280 | 5 h | 70 | 30 | 0.0 | 1.8 | 1.7 | 33 | 18.6 | 4.6 | 4.1 | 1.5 | Not observed |
| 31 | 290 | 30 min | 70 | 30 | 4.1 | 1.1 | 1.1 | 34 | 19.1 | 4.5 | 4.0 | 1.4 | Not observed |
| 32 | 300 | 30 min | 70 | 30 | 0.0 | 1.8 | 1.8 | 36 | 18.6 | 4.6 | 4.2 | 1.5 | Not observed |
| 33 | 270 | 3 h | 50 | 50 | 4.6 | 0.4 | 0.4 | 27 | 19.0 | 5.9 | 3.8 | 1.2 | Not observed |
| 34 | 280 | 5 h | 50 | 50 | 0.0 | 1.8 | 1.6 | 28 | 18.9 | 6.1 | 4.0 | 1.3 | Not observed |
| 35 | 290 | 30 min | 50 | 50 | 1.5 | 0.7 | 0.7 | 29 | 19.0 | 5.8 | 3.9 | 1.2 | Not observed |
| 36 | 300 | 1 min | 50 | 50 | 0.0 | 1.8 | 1.8 | 30 | 18.8 | 6.1 | 4.0 | 1.3 | Not observed |

*2 A polyimide resin obtained using aniline as an end sealant.

TABLE 4

Examples 37–48

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 37 | 260 | 5 h | 80 | 20 | 4.6 | 1.1 | 1.1 | 44 | 19.2 | 4.1 | 3.8 | 1.3 | Not observed |
| 38 | 270 | 3 h | 80 | 20 | 4.1 | 1.2 | 1.1 | 46 | 19.1 | 4.4 | 3.8 | 1.3 | Not observed |
| 39 | 280 | 5 h | 80 | 20 | 0.0 | 2.0 | 2.0 | 48 | 19.0 | 4.5 | 3.9 | 1.4 | Not observed |
| 40 | 290 | 30 min | 80 | 20 | 3.2 | 1.4 | 1.2 | 47 | 18.9 | 4.1 | 3.8 | 1.3 | Not observed |
| 41 | 260 | 5 h | 70 | 30 | 4.4 | 1.0 | 1.0 | 28 | 17.9 | 4.1 | 3.7 | 1.3 | Not observed |
| 42 | 270 | 3 h | 70 | 30 | 3.8 | 1.1 | 1.1 | 30 | 17.8 | 4.1 | 3.7 | 1.3 | Not observed |
| 43 | 280 | 5 h | 70 | 30 | 0.0 | 1.8 | 1.7 | 32 | 17.0 | 4.3 | 3.8 | 1.4 | Not observed |
| 44 | 290 | 30 min | 70 | 30 | 3.0 | 1.3 | 1.3 | 32 | 17.5 | 4.1 | 3.7 | 1.3 | Not observed |
| 45 | 260 | 5 h | 60 | 40 | 4.2 | 0.6 | 0.6 | 27 | 18.0 | 4.2 | 4.2 | 1.0 | Not observed |
| 46 | 270 | 3 h | 60 | 40 | 3.6 | 0.6 | 0.5 | 28 | 17.8 | 4.3 | 4.2 | 1.0 | Not observed |
| 47 | 280 | 5 h | 60 | 40 | 0.0 | 1.0 | 1.0 | 30 | 17.8 | 4.4 | 4.3 | 1.1 | Not observed |
| 48 | 290 | 30 min | 60 | 40 | 0.8 | 0.9 | 0.9 | 31 | 18.0 | 4.4 | 4.3 | 1.1 | Not observed |

TABLE 5

Comparative Examples 1–9

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 1 | 250 | 12 h | 100 | 0 | 9.8 | 7.1 | 7.0 | 88 | 13.1 | 5.1 | 3.2 | 1.9 | Not observed |
| 2 | 250 | 672 h | 100 | 0 | 5.2 | 10.3 | 10.1 | 110 | 12.0 | 3.6 | 3.6 | 2.1 | Not observed |

TABLE 5-continued

Comparative Examples 1–9

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 3 | 260 | 1 h | 100 | 0 | 9.7 | 7.4 | 7.4 | 70 | 13.2 | 5.1 | 3.3 | 1.9 | Not observed |
| 4 | 260 | 336 h | 100 | 0 | 7.2 | 11.0 | 10.9 | 102 | 12.6 | 4.0 | 3.4 | 2.1 | Not observed |
| 5 | 270 | 30 min | 100 | 0 | 9.8 | 7.7 | 7.5 | 97 | 13.0 | 5.2 | 3.2 | 1.9 | Not observed |
| 6 | 270 | 20 h | 100 | 0 | 0.0 | 9.2 | 9.0 | 126 | 11.6 | 2.8 | 3.7 | 2.4 | Not observed |
| 7 | 280 | 1 min | 100 | 0 | 6.8 | 8.0 | 8.0 | 105 | 12.1 | 3.9 | 3.4 | 2.2 | Not observed |
| 8 | 280 | 1 h | 100 | 0 | 4.7 | 12.3 | 12.0 | 130 | 11.8 | 3.6 | 3.6 | 2.1 | Not observed |
| 9 | 300 | 2 h | 100 | 0 | 0.0 | 9.0 | 8.8 | 140 | 12.0 | 2.7 | 3.8 | 2.4 | Not observed |

TABLE 6

Comparative Examples 10–21

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 10 | 270 | 1 h | 90 | 10 | 8.4 | 0.4 | 0.4 | 48 | 15.3 | 1.8 | 3.0 | 0.9 | Not observed |
| 11 | 280 | 30 min | 90 | 10 | 9.0 | 0.2 | 0.2 | 47 | 16.1 | 1.7 | 2.9 | 0.9 | Not observed |
| 12 | 290 | 5 min | 90 | 10 | 9.5 | 0.2 | 0.2 | 48 | 15.8 | 1.7 | 3.0 | 0.9 | Not observed |
| 13 | 260 | 1 h | 80 | 20 | 10.0 | 0.0 | 0.0 | 40 | 14.2 | 2.0 | 3.0 | 0.5 | Not observed |
| 14 | 270 | 1 h | 80 | 20 | 7.8 | 0.4 | 0.3 | 42 | 14.7 | 2.1 | 3.0 | 0.9 | Not observed |
| 15 | 280 | 30 min | 80 | 20 | 8.8 | 0.2 | 0.2 | 42 | 14.9 | 2.1 | 3.1 | 0.9 | Not observed |
| 16 | 260 | 1 h | 70 | 30 | 9.9 | 0.1 | 0.1 | 25 | 13.0 | 3.4 | 3.0 | 0.8 | Not observed |
| 17 | 270 | 1 h | 70 | 30 | 8.0 | 0.4 | 0.3 | 26 | 12.7 | 3.4 | 3.0 | 0.9 | Not observed |
| 18 | 280 | 30 min | 70 | 30 | 7.9 | 0.4 | 0.4 | 26 | 12.9 | 3.4 | 3.0 | 0.9 | Not observed |
| 19 | 260 | 30 min | 60 | 40 | 9.5 | 0.1 | 0.1 | 20 | 12.1 | 3.2 | 2.9 | 0.7 | Not observed |
| 20 | 270 | 30 min | 60 | 40 | 9.0 | 0.2 | 0.2 | 21 | 12.0 | 3.1 | 3.0 | 0.7 | Not observed |
| 21 | 280 | 5 min | 60 | 40 | 8.7 | 0.2 | 0.2 | 23 | 11.9 | 3.1 | 3.0 | 0.7 | Not observed |

TABLE 7

Comparative Examples 22–23

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 22 | 280 | 5 h | 30 | 70 | 0.0 | 0.6 | 0.5 | 15 | 14.2 | 1.2 | 2.9 | 0.3 | Not observed |
| 23 | 290 | 4 h | 10 | 90 | 0.0 | 0.6 | 0.6 | 13 | 13.9 | 1.0 | 2.9 | 0.2 | Not observed |

TABLE 8

Comparative Examples 24–25

| No. | Heat treatment conditions Tmp. °C. | Time | Composition of product (part by weight) Polyimide resin | PEEK | Crystallization enthalpy of polyimide component (cal/g) | Dimensional change (%) MD | TD | Roundness (μm) | Tensile strength (kg/cm²) 25° C. | 230° C. | Modulus in flexure × 10⁴ kg/cm² 23° C. | 230° C. | Peeling |
|---|---|---|---|---|---|---|---|---|---|---|---|---|---|
| 24 | 280 | 5 h | 30 | 70 | 0.0 | 0.7 | 0.6 | 16 | 14.6 | 1.3 | 2.9 | 0.3 | Not observed |
| 25 | 290 | 6 h | 10 | 90 | 0.0 | 0.7 | 0.7 | 14 | 14.1 | 1.1 | 2.9 | 0.3 | Not observed |

TABLE 9

Comparative Examples 26–27

| No. | Heat treatment conditions Tmp. °C. | Time | Composition of product (part by weight) Polyimide resin | LCP | Crystallization enthalpy of polyimide component (cal/g) | Dimensional change (%) MD | TD | Roundness (μm) | Peeling |
|---|---|---|---|---|---|---|---|---|---|
| 26 | 280 | 2 h | 80 | 20 | 5.7 | 0.4 | 0.9 | 98 | Observed |
| 27 | 270 | 3 h | 80 | 20 | 5.2 | 0.5 | 0.9 | 105 | Observed |

*The term "LCP" as used herein means a liquid crystal polymer. As LCP, "Zaider" and "Econole" were employed in Comparative Examples 32 and 33, respectively.

TABLE 10

Examples 49–50, Comparative Examples 28–29

| | Composition of product (part by weight) Polyimide resin | PEEK | PEK | Spiral flow length of product (mm) No Residence | After 10-min Residence |
|---|---|---|---|---|---|
| Example 49 | 80 | 20 | | 90 | 69 |
| Example 50 | 60 | 40 | | 84 | 71 |
| Comp. Ex. 28 | 80 | | 20 | 75 | 29 |
| Comp. Ex. 29 | 60 | | 40 | 63 | 25 |

TABLE 11

Examples 51–55, Comparative Examples 30–32

Composition of fiber-reinforced resin

| | Ratio of resin blended (part by weight) Polyimide resin | PEEK | Kind of resin | Composition (part by weight) Resin | Fiber | Evaluation result Ra (μm) Before crystallization | After crystallization |
|---|---|---|---|---|---|---|---|
| Example 51 | 90 | 10 | Carbon | 70 | 30 | 0.81 | 1.47 |
| Example 52 | 70 | 30 | Carbon | 70 | 30 | 0.72 | 1.42 |
| Example 53 | 70 | 30 | Carbon | 90 | 10 | 0.51 | 1.24 |
| Example 54 | 70 | 30 | Carbon | 50 | 50 | 0.85 | 1.55 |
| Example 55 | 70 | 30 | Glass | 70 | 30 | 0.72 | 1.40 |
| Comp. Ex. 30 | 100 | 0 | Carbon | 70 | 30 | 0.95 | 3.21 |

TABLE 11-continued

Examples 51–55, Comparative Examples 30–32

Composition of fiber-reinforced resin

| | Ratio of resin blended (part by weight) | | Kind of | Composition (part by weight) | | Evaluation result Ra (μm) | |
|---|---|---|---|---|---|---|---|
| | Polyimide resin | PEEK | resin | Resin | Fiber | Before crystallization | After crystallization |
| Comp. Ex. 31 | 100 | 0 | Glass | 70 | 30 | 0.82 | 3.15 |
| Comp. Ex. 32 | 70 | 30 | Carbon | 45 | 55 | 1.25 | 4.81 |

TABLE 12

Examples 57–60, Comparative Examples 33–34

Composition of fiber-reinforced resin

| | Ratio of resin blended (part by weight) | | Kind of | Composition (part by weight) | | Evaluation result Ra (μm) | |
|---|---|---|---|---|---|---|---|
| | Polyimide resin | PEEK | resin | Resin | Fiber | Before crystallization | After crystallization |
| Example 57 | 70 | 30 | Carbon | 70 | 30 | 0.70 | 1.45 |
| Example 58 | 70 | 30 | Glass | 70 | 30 | 0.75 | 1.42 |
| Example 59 | 70 | 30 | Carbon | 70 | 30 | 0.74 | 1.43 |
| Example 60 | 70 | 30 | Glass | 70 | 30 | 0.71 | 1.46 |
| Comp. Ex. 33 | 100 | 0 | Carbon | 70 | 30 | 0.98 | 3.05 |
| Comp. Ex. 34 | 100 | 0 | Carbon | 70 | 30 | 0.96 | 3.12 |

We claim:

1. A polyimide resin composition comprising:

50–95 parts by weight of a polyimide resin having recurring units represented by the following formula (1):

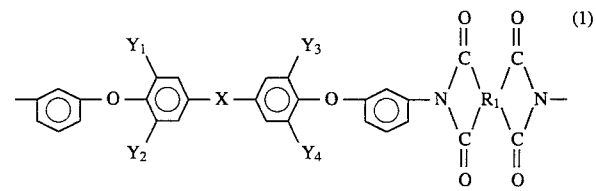

wherein X represents a direct bond or a group selected from the group consisting of a divalent hydrocarbon group having 1–10 carbon atoms, a hexa-fluorinated isopropylidene group, a carbonyl group, a thio group, a sulfonyl group and an oxo group; $Y_1$, $Y_2$, $Y_3$ and $Y_4$ individually represent a group selected from the group consisting of a hydrogen atom, a lower alkyl group having 1–9 carbon atoms, a lower alkoxy group having 1–9 carbon atoms, a chlorine atom and a bromine atom; and $R_1$ represents a tetravalent group having 2–27 carbon atoms, said tetravalent group being selected from the group consisting of aliphatic groups, monocyclic aliphatic groups, monocyclic aromatic groups, fused polycyclic aromatic groups, and non-fused polycyclic aromatic groups with aromatic rings bonded together directly or via a crosslinking member; and 50–5 parts by weight of a polyetheretherketone having a molecule thereof, recurring units represented by the formula (2):

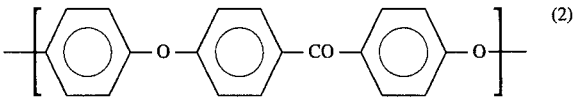

said composition having being subjected to heat treatment at 250°–330° C. and, after the heat treatment, having crystallization enthalpy of 0–6 cal/g as measured by a differential scanning calorimeter at a heating rate of 10° C./min.

2. The polyimide resin composition of claim 1, wherein the polyimide resin having recurring units represented by the formula (1) has been substituted at ends of a polymer molecule thereof by a dicarboxylic anhydride represented by the following formula (A):

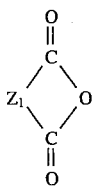

wherein $Z_1$ represents a divalent group having 6–15 carbon atoms and selected from the group consisting of aliphatic groups, alicyclic groups, monocyclic aromatic groups, fused polycyclic aromatic groups, and non-fused polycyclic aromatic groups with aromatic rings bonded together directly or via a crosslinking member; or by an aromatic monoamine represented by the following formula (B):

$$Z_2 - NH_2 \quad (B)$$

wherein $Z_2$ represents a monovalent group having 6–15 carbon atoms and selected from the group consisting of aliphatic groups, alicyclic groups, monocylic aromatic groups, fused polycyclic aromatic groups and non-fused polycyclic aromatic groups with aromatic rings bonded together directly or via a crosslinking member.

3. The polyimide resin composition of claim 1, wherein the polyimide resin has recurring units represented by the following formula (1'):

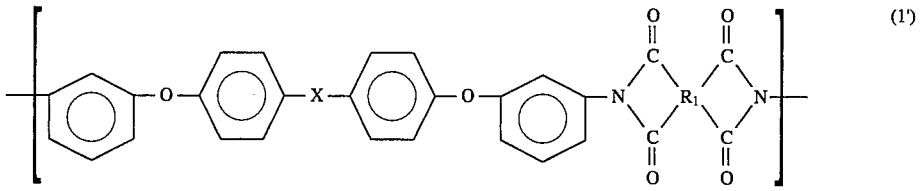

wherein X and $R_1$ have the same meanings as defined above in the formula (1).

4. The polyimide resin composition of claim 1, comprising 60-95 parts by weight of the polyimide resin and 40–5 parts by weight of the polyetheretherketone.

5. The polyimide resin composition of claim 1, comprising 60–90 parts by weight of the polyimide resin and 40–10 parts by weight of the polyetheretherketone.

6. The fiber-reinforced polyimide resin composition comprising 99–50 parts by weight of the resin composition of claim 1 and 1–50 parts by weight of fibers.

7. The fiber-reinforced polyimide resin composition of claim 6, wherein the fibers are at least one type of fibers selected from the group consisting of carbon fibers, glass fibers, metal fibers, aramid fibers, potassium titanate fibers, and aluminum borate fibers.

* * * * *